United States Patent [19]

Schlueter

[11] 4,150,004
[45] Apr. 17, 1979

[54] PROCESS FOR THE PRODUCTION OF SYNTHETIC RUBBER LATICES HAVING A HIGH SOLIDS CONTENT

[75] Inventor: Herbert Schlueter, Marl, Fed. Rep. of Germany

[73] Assignee: Chemische Werke Huels Aktiengesellschaft, Marl, Fed. Rep. of Germany

[21] Appl. No.: 834,023

[22] Filed: Sep. 16, 1977

Related U.S. Application Data

[63] Continuation-in-part of Ser. No. 785,707, Apr. 7, 1977, abandoned.

[30] Foreign Application Priority Data

Oct. 6, 1976 [DE] Fed. Rep. of Germany ....... 2645082

[51] Int. Cl.² ............................................... C08L 9/08
[52] U.S. Cl. ........................... 260/23.7 A; 260/29.7 R
[58] Field of Search ...................... 260/23.7 A, 29.7 R

[56] References Cited

U.S. PATENT DOCUMENTS

| 2,605,242 | 7/1952 | Betts, Jr. et al. | 260/23.7 A |
| 2,689,235 | 9/1954 | Henson et al. | 260/23.7 A |
| 3,272,767 | 9/1966 | Howland et al. | 260/23.7 A |
| 3,770,674 | 11/1973 | Araki et al. | 260/23.7 A |

FOREIGN PATENT DOCUMENTS

| 653195 | 11/1962 | Canada | 260/23.7 A |
| 996774 | 6/1965 | United Kingdom | 260/23.7 A |

OTHER PUBLICATIONS

Brown et al., "Rubber World", Jul. 1955, pp. 471-476.

Primary Examiner—M. J. Welsh
Attorney, Agent, or Firm—Millen & White

[57] ABSTRACT

A process for the production of synthetic rubber latices having a high solids content and a low viscosity by low-temperature redox emulsion polymerization with subsequent agglomeration of the latex particles with oxidized polyethylene oxides, comprises conducting the redox emulsion polymerization in a system wherein the ratio of monomers to water is 0.85 to 1.25; the amount of emulsifier is 2.0 to 4.0 parts by weight per 100 parts by weight of monomers; the alkali metal salt concentration in the aqueous phase is 35-70 mmol./l; and the average rate of conversion of monomers is 8% per hour.

10 Claims, No Drawings

PROCESS FOR THE PRODUCTION OF SYNTHETIC RUBBER LATICES HAVING A HIGH SOLIDS CONTENT

CROSS REFERENCE TO RELATED APPLICATIONS

This application is a continuation-in-part of U.S. Application Ser. No. 785,707, filed on Apr. 7, 1977 and now abandoned.

BACKGROUND OF THE INVENTION

This invention relates to a process for the production of synthetic rubber latices having a high solids content and a low viscosity using low temperature redox emulsion polymerization with subsequent agglomeration of the latex particles with oxidized polyethylene oxides.

It is known that the latex particles must be relatively large and their particle size distribution must be relatively broad in order to obtain synthetic latices having a high solids content and a low viscosity.

Two different types of methods are known to obtain synthetic rubber latices having the required particle size and particle size distribution.

In accordance with the first type of process, the required particle size properties are achieved during the course of the polymerization. For this purpose, polymerization systems are utilized wherein the ratio of monomer to water is adjusted to about 0.8 to 1.5, i.e., a "high solids" ratio is employed. The polymerization reactions are started with a relatively low amount of emulsifier, i.e., up to 2 parts by weight, based on the amount of the monomers to be polymerized. These polymerization systems contain, in addition to an increased content of dispersing agent, such as for example a condensation product of formaldehyde and naphthalenesulfonic acid, still other chemical agents for increasing the particle size such as alkali metal salts in a concentration of >70 millimoles/liter; (R. W. Brown and L. H. Howland, "Growth and Agglomeration of Particles in Low-temperature GRS Type Latex", Rubber World, July 55, p. 47) or also water-soluble salts of bivalent cations in a concentration of 0.01–1 mmol/l., in combination with water-soluble, higher-molecular weight agglomerating agents in minor concentrations according to DT-OS 2,165,410. It is also possible to cause the latex particles to agglomerate in systems of higher hydrocarbon/H$_2$O ratios by mechanical means with the use of thorough agitation at lower electrolyte concentrations of <30 mmol./l. (U.S. Pat. No. 3,080,334). However, both kinds of polymerizations require time periods of >12 hours in order to achieve a conversion of 60–70%. Moreover, the reactors must be cleaned frequently. This is a grave disadvantage, for example, in view of modern polymerization plants with reactor sizes of 200 m$^3$, since expensive cleaning procedures become necessary. Moreover, it is difficult to produce latices having a uniform quality with the use of these processes.

On account of the aforedescribed disadvantages, polymerization systems have been utilized in more recent times with advantage in this technology which pertain to a second process type, wherein a ratio of monomer to water of 0.55 to 0.80, i.e., a "low solids" ratio, is employed. This makes it possible to conduct the polymerization in relatively short periods of time of <10 hours. The latex particle size and/or distribution are adjusted only after the polymerization in a separate process step by the use of mechanical means, such as pressure homogenizers or chill rolls, as well as by chemical means, such as, for example, by addition of oxidized polyethylene oxides. A disadvantage of these processes is the increased energy consumption required to concentrate such latices to high solids contents. Larger devices are required for the concentration step. The latex must furthermore be recirculated relatively frequently during the concentration in the forced circulation evaporator by way of heat exchangers. This produces increased manufacturing costs in this process stage.

SUMMARY OF THE INVENTION

It is an object of the invention to find a process wherein the aforementioned disadvantages of the prior art process types do not occur. In the novel emulsion polymerization systems, the ratio of monomer to water is set relatively high while polymerization is still accomplished within short time periods.

Such a process has been found by conducting the redox emulsion polymerization in a system wherein the ratio of monomer to water is 0.85–1.25, the polymerization being carried out in the presence of 2.0–4.0 parts by weight of emulsifier per 100 parts by weight of monomers and with an alkali metal salt concentration of 35–70 mmol./l., preferably 35 to 50 mmol./l., in the aqueous phase at an average rate of at least 8% conversion per hour of the originally used monomers.

DETAILED DESCRIPTION

It is possible in accordance with the process of this invention to produce synthetic hydrocarbon rubber dispersions. Preferred are those rubbers obtained by the polymerization of 50–100% by weight of a conjugated diolefin, as well as 0–50% by weight of a vinyl aromatic compound. Monomers having reactive end groups are not to be employed in accordance with the claimed process. Suitable rubbers include for example butadiene-1.3/styrene-, butadiene-1.3/acrylonitrile-copolymers or homopolymers of chloro-2-butadiene-1.3.

These latices contain, as the emulsifiers, alkali metal salts of fatty acids, disproportionated rosin acids or alkyl or arylalkyl sulfonates in an amount of 2.0–4.0, preferably 2.5–3.5 parts by weight per 100 parts by weight of polymerizable monomers. These emulsifiers emulsify the monomers in the aqueous phase and cover the thus-formed latex particles during the course of the polymerization. They are present, after a polymerization conversion of just 3%, merely in a concentration of less than 1 mmol./l. in the aqueous phase, and their concentration decreases still further to a great extent during the further course of the polymerization. As a result they are not included as components of the "alkali metal salt concentration" specified elsewhere herein.

In contrast thereto, the concentration of the added alkali metal electrolytes remains constant in the aqueous phase during the polymerization. Such electrolytes are used in a concentration of 35–70 mmol./l. Suitable electrolytes are the alkali metal salts of strong inorganic acids, such as, for example, hydrohalic acids, e.g. hydrochloric-, hydrobromic- and hydriodic acid, sulfuric acid, phosphoric acid or nitric acid, as well as of weak acids, such as, for example, carbonic acid or acetic acid. If the electrolytes are used in a concentration of less than 35 mmol./l., such a high viscosity is developed during the polymerization that the reaction mixtures can no longer be agitated under normal conditions. If the electrolytes are utilized in concentrations higher than 70 mmol./l., then extensive particle agglomerations result during polymerizing, by which the polymerizing speed is greatly slowed down and/or parts of the polymerization mixture are precipitated. Thereby, the reactor vessel must be cleaned more frequently. By the adjustment of the electrolyte concentration in accordance with the invention, these disadvantages are avoided and the polymerization can be conducted in time periods of <12 hours. As discussed in "Fast Emulsion Polymerization at High Solids", Ind. Eng. Chem., Prod. Res. Dev. 16, p. 163–168 (June 1977) by the inventor, it is believed that the advantageous effects of this invention in high solids systems are due to the phenomenom of "preagglomeration" by which particle size is enlarged without deleterious effect on the solid/viscosity relationship of the final latex or on the polymerization rate.

Included in the above-defined concentration of alkali metal electrolytes are all alkali metal salts in the polymerization system, other than those of the emulsifiers, which are rapidly removed as discussed above. Such salts include those derived from the redox system used to initiate polymerization. For example, in Example 1 the tetrasodium salt of ethylenediaminetetraacetic acid, sodium formaldehyde sulfoxylate and sodium dithionite are included along with potassium chloride but potassium oleate is not.

Furthermore, the viscosity of the polymerization batches does not rise to infinitely high values, as would be expected; rather, the viscosity is maintained within a range of 6,500–40,000 mPa s. (milli-Pascal seconds), preferably between 10,000 and 30,000 mPa s. It has been found that such viscosities are advantageous to be able to remove the heat of polymerization by evaporation and condensation of butadiene via reflux condensation, without causing the polymerization mixture to foam.

To start up the polymerization, the conventional redox initiator systems are utilized, composed of an oxidant, such as, for example, organic hydroperoxides such as p-methane hydroperoxide, cumol hydroperoxide, diisopropyl hydroperoxide, pinane hydroperoxide and the like; and reducing agents, such as, for example, sodium formaldehyde sulfoxylate in combination with easily ionized heavy metal salts such as iron sulfate, cobalt chloride, nickel nitrate and the like. These metal ions are complexed by complexing agents such as the sodium salt of ethylenediamintetra-acetic acid, sodium or potassium phosphate, or sodium or potassium pyrophosphate. Furthermore, such compounds as sodium dithionite or sodium hydrogen sulfite are often employed in order to collect any oxygen generated in the activation and thereby prevent the delaying of the polymerization. These systems provide for a rapid polymerization even at lower polymerization temperatures of 5°–50° C. These redox initiators are utilized for producing the latices of this invention advantageously in incremental portions during the course of the polymerization. Thus, a preferred embodiment resides, for example, in adding these initiators in metered amounts shortly before the rise in latex viscosity in the range of 20–30% conversion. In this way, polymerization times of about 5 hours up to a conversion of 70% at 5°–50° C. can be advantageously attained.

Another preferred embodiment of the polymerization method resides also in that the polymerization is terminated at a conversion of 60–80% by the addition of suitable short-stop agents, in order to prevent excessive gelling of the polymer. As the short-stop agents, dithiocarbamates or also substituted hydroxylamines, such as, for example, diethylhydroxylamine, can be utilized as is conventional.

The polymerization process of this invention can be conducted continuously or also discontinuously, as desired.

The latices of this invention are agglomerated after polymerization with oxidized polyethylene oxides, utilized in an amount of 0.001–1% by weight, preferably 0.01–0.15% by weight, based on the solids proportion of the latex.

The latices of this invention with a high solids content and a low viscosity can be utilized advantageously for the production of foam rubbers, such as, for example, molded foam articles or foamed carpet backings, adhesives, and other products. Moreover, the transportation costs of such latices with solids contents of 65–70% are relatively low.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

EXAMPLE 1

The polymerization was conducted in a pressure vessel having a capacity of 150 liters, equipped, to remove the heat of polymerization, with a cooling jacket and with a reflux condenser.

The following mixture was introduced into the reactor after the latter had been purged with butadiene vapor:

| Materials | Parts |
| --- | --- |
| Water | 100 |
| 1,3-Butadiene | 69 |
| Styrene (total monomer content 54 kg.) | 31 |
| tert.-Dodecyl mercaptan | 00.9 |
| Potassium chloride | 0.291 |
| Consensation product of naphthalenesulfonic acid and formaldehyde | 0.06 |
| Tetrasodium salt of ethylenediaminetetraacetic acid | 0.027 |
| Iron (III) sulfate heptahydrate | 0.0053 |
| Sodium formaldehyde sulfoxylate | 0.05 |
| Pinane hydroperoxide, 50% strength | 0.056 |
| Sodium dithionite | 0.015 |
| Potassium oleate | 2.7 |
| Temperature 5° – 40° C. | |

The electrolyte concentration in the aqueous phase of this mixture is 44 mmol./l. The viscosity of the polymerization mixture as obtained during the course of the polymerization was measured on samples withdrawn at certain intervals, in the presence of the still unreacted monomers. The polymerization time up to 70% conversion of the monomers was 5 hours. The viscosity of the polymerization mixture rose steeply in the conversion range of 25–35% and reached a maximum value of 23,000 mPa s. at a conversion of 55–60%. At a viscosity of respectively 600 and 1,200 mPa s., 0.014 part of pinane hydroperoxide (50% strength) was respectively added in metered amounts. The surface tension in dependence on the conversion of the batch showed a steady characteristic and had a value of 70 mN/m. (milli-Newton per meter). The latex particles were agglomerated after polymerization in the presence of the residual monomers in a conventional manner with 0.1 part of oxidized polyethylene oxide, based on 100 parts of latex solids. After removal of the residual monomers and concentration, a latex is obtained having a solids content of 69% and a viscosity of 1,200 mPa s.

EXAMPLE 2

The polymerization according to Example 1 was repeated, but the monomer ratio was set to be 90 parts of butadiene and 10 parts of styrene, the emulsifier content was set to be 2.0 parts, and the potassium chloride amounted to 0.24 part. The polymerization period was 5 hours to a conversion of 70%. The surface tension showed a steady curve and had a value of 70 mN/m. The viscosity reached a maximum value with 28,000 mPa s. in the conversion range of 55-60%. The latex could be agglomerated with 0.1 part of oxidized polyethylene oxide (based on 100 parts of latex solids). After removal of the residual monomers and concentration, a solids content of 70% was obtained at 1,200 mPa s.

EXAMPLE A

The polymerization according to Example 1 was repeated, but the concentration of the alkali salts in the aqueous phase was adjusted to 15 mmol./l. The viscosity rose, in the range of 25-35% conversion, to values of such magnitude that a homogeneity of the batch could no longer be attained even by intense agitation.

EXAMPLE B

The polymerization according to Example 1 was repeated, but the electrolyte concentration in the aqueous phase was adjusted to 120 mmol./l. The viscosity of the batch showed a value of 1,000 mPa s. The polymerization time was 15 hours. The surface tension of the latex did not show a steady characteristic and reached merely 63 mN/m. during the course of the polymerization. Owing to strong foaming, the reflux condensation could not be utilized to remove the heat of polymerization. The reactor showed a thick coating after the polymerization and had to be cleaned.

EXAMPLE C

The polymerization according to Example 1 was repeated, but the ratio of monomers to water was set to be 100:60=1.67. The surface tension of the latex after polymerization had a value of only 52 mN/m. The latex, after agglomeration with oxidized polyethylene oxides, could be concentrated only to a solids content of 55% at a viscosity of 1,200 mPa s.

The examples denoted by letters are not in accordance with the invention.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a process for the production of synthetic hydrocarbon rubber latices having a high solids content and a low viscosity by low-temperature redox emulsion polymerization with subsequent agglomeration of the latex particles with oxidized polyethylene oxides, the improvement which comprises conducting the redox emulsion polymerization in a system wherein the ratio of monomers to water is 0.85 to 1.25; the amount of emulsifier is 2.0 to 4.0 parts by weight per 100 parts by weight of monomers; the alkali metal salt concentration in the aqueous phase is 35-70 mmol/l; the average rate of conversion of the originally charged monomers is at least 8% per hour and the emulsifier is an alkali metal salt of a fatty acid, a disproportionated rosin acid or an alkyl or aralkyl sulfonate or a mixture thereof.

2. The process of claim 1, wherein the polymerization is conducted in the presence of 2.5-3.5 parts by weight of emulsifier.

3. The process of claim 1 wherein said monomers are 50-100% by weight of a conjugated diolefin and 50-0% by weight of a vinyl aromatic compound.

4. The process of claim 1 wherein said conjugated diolefin is butadiene and said vinyl aromatic compound is styrene.

5. The process of claim 1, wherein said alkali metal salt concentration is derived at least in part from addition to the polymerization system of an alkali metal salt of a strong inorganic acid, carbonic acid or acetic acid.

6. The process of claim 1 wherein said polymerization is terminated at 60-80% conversion of monomer by addition of a short-stop agent.

7. A process for the production of synthetic hydrocarbon rubber latices having a high solids content and a low viscosity by low-temperature redox emulsion polymerization, which comprises conducting the redox emulsion polymerization in a system wherein the ratio of monomers to water is 0.85 to 1.25; the amount of emulsifier is 2.0 to 4.0 parts by weight per 100 parts by weight of monomers; the alkali metal salt concentration in the aqueous phase is 35-70 mmol/l; and the average rate of conversion of the originally used monomers is at least 8% per hour and the emulsifier is an alkali metal salt of a fatty acid, a disproportionated rosin acid or an alkyl or aralkyl sulfonate or a mixture thereof.

8. A process according to claim 1, wherein said alkali metal salt concentration is 35-50 mmol./l.

9. A process according to claim 7, wherein said alkali metal salt concentration is 35-50 mmol./l.

10. The process of claim 1 wherein the system in which the redox emulsion polymerization is conducted consists essentially of water, emulsifier, monomers, alkali metal salt electrolyte and a redox initiator.

* * * * *